Figure 1:
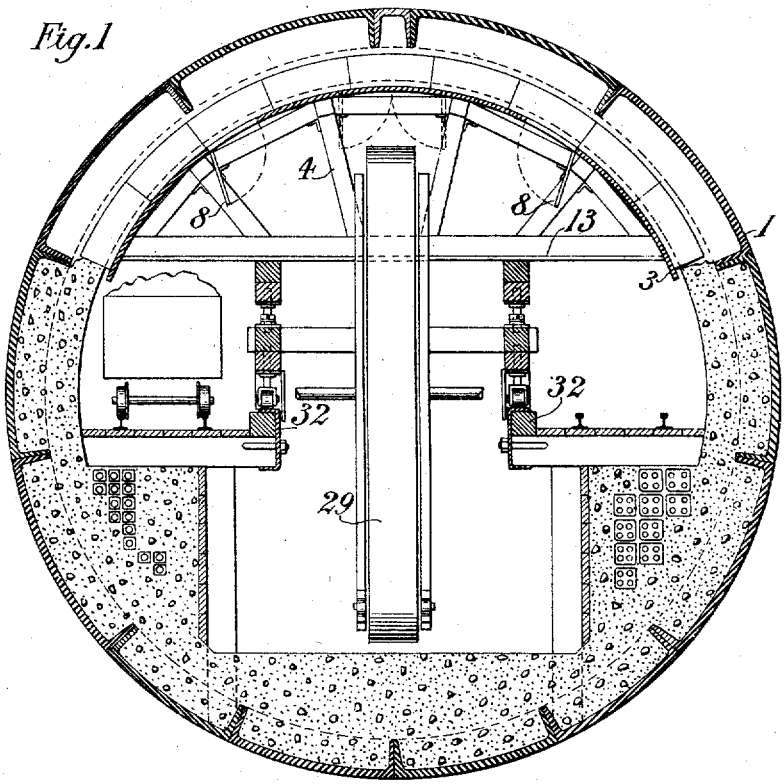

No. 12,410. REISSUED NOV. 21, 1905.

J. W. RENO.

TUNNEL APPARATUS.

APPLICATION FILED SEPT. 10, 1904.

2 SHEETS—SHEET 1.

Witnesses
H. S. Williams
Wm. H. Vogel

Jesse W. Reno Inventor by J. D. Merrill Atty

No. 12,410. REISSUED NOV. 21, 1905.

J. W. RENO.

TUNNEL APPARATUS.

APPLICATION FILED SEPT. 10, 1904.

2 SHEETS—SHEET 2.

Witnesses
T. D. Williams
Tom H. Boyd

Jesse W. Reno Inventor
by T. D. Merrim Att'y

UNITED STATES PATENT OFFICE.

JESSE W. RENO, OF NEW YORK, N. Y.

TUNNEL APPARATUS.

No. 12,410. Specification of Reissued Letters Patent. Reissued Nov. 21, 1905.

Original No. 761,786, dated June 7, 1904. Application for reissue filed September 10, 1904. Serial No. 224,038.

*To all whom it may concern:*

Be it known that I, JESSE WILFORD RENO, a citizen of the United States of America, and a resident of the city, county, and State of New York, have invented certain new and useful Improvements in Tunnel Apparatus, of which the following is a specification.

My invention relates to apparatus for the construction of tunnel-linings, and particularly for the linings of that class of tunnels where the tunnel-shell is composed of iron segments bolted together in the form of a circular cylinder and the lining is formed of concrete.

The object of my invention is to provide an apparatus to assist in the construction of concrete linings for tunnels, particularly the upper portions of the linings.

My invention consists in providing an arched form or center, in providing means for bringing said form into position and for advancing it for consecutive portions of the tunnel-lining, in providing openings and closures therefor in the arched form by means of which the corners and recesses formed by the flanges of the segments and the nuts and bolt-heads may be properly tamped or rammed with concrete, in providing movable ends for the arched form by means of which the concrete may be securely forced in place, in providing a slidable ram by means of which great pressure is brought upon the concrete, in providing means for delivering concrete to the apparatus, and in other novel features of construction to be hereinafter more fully pointed out and described.

Where the ordinary centers are employed to line tunnels, great difficulty is experienced in properly filling and packing concrete into the corners and narrow spaces made by the flanges of the tunnel-segments and by the bolt-heads and nuts employed to bind the flanges together, as will be readily apparent when the form of the segments and flanges is understood. By means of my improved construction, as will hereinafter appear, all parts of that section of the tunnel-shell which is being concreted or lined are readily accessible to the operator, and the work may be satisfactorily inspected during its progression.

Very little difficulty is experienced in constructing the concrete at the sides and bottom of the tunnel, as the opening between the forms used and the tunnel-shell may always be left open at the tops of said forms. When, however, the upper portions of the linings are constructed, an arched form or center is required. It is essential that the concrete should be firmly compacted and that all of the corners and spaces behind and around the bolt-heads and nuts should be thoroughly filled. To do this with the ordinary centers employed in works of this kind would be difficult, if not impossible. By means of my improved apparatus all parts of the work are rendered accessible and the work may be carried on in an expeditious and efficient manner.

Figure 3:
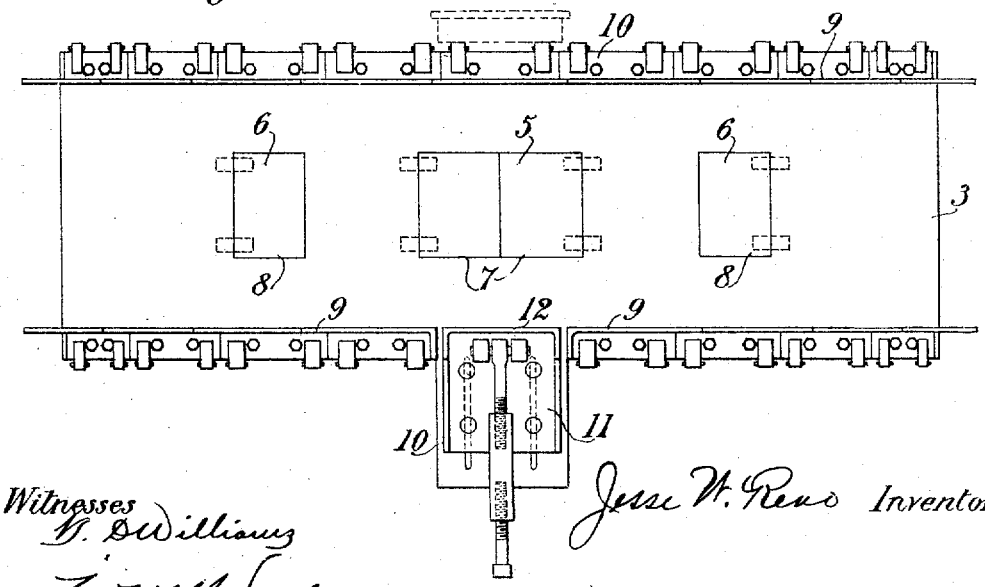
Figure 2:
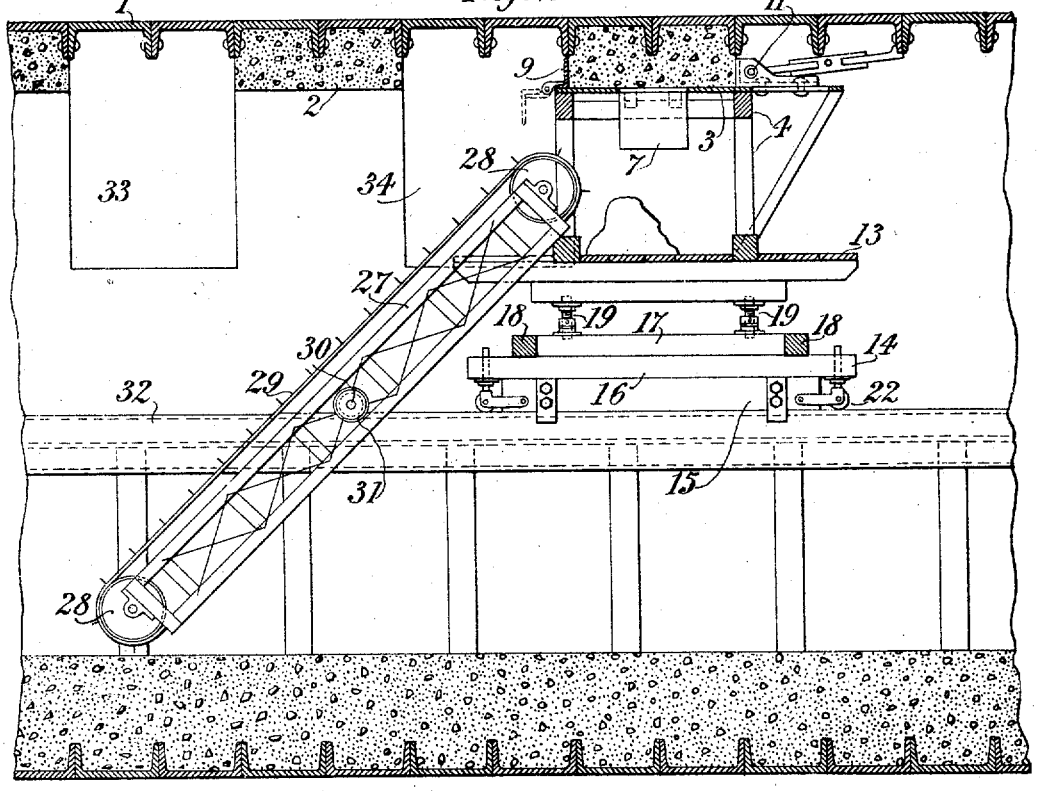
Figure 4:
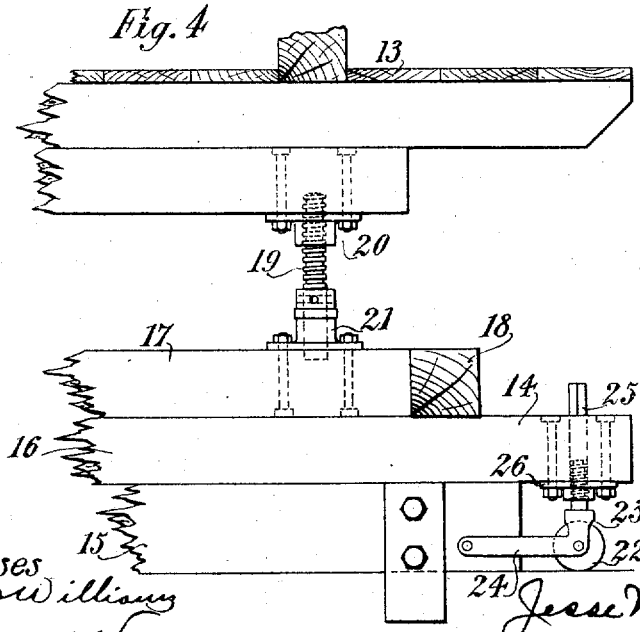
Figure 5:
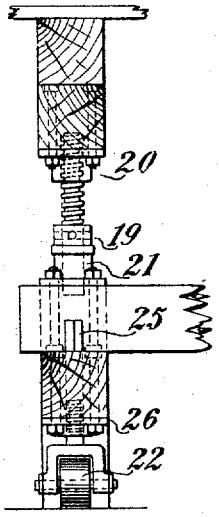

In the drawings accompanying and forming part of this specification, Figure 1 represents a transverse section of a tunnel equipped with my improved apparatus. Fig. 2 represents a longitudinal section of the same. Fig. 3 represents a plan view, on an enlarged scale, of the arched form. Fig. 4 represents an enlarged detailed view of a portion of the support; and Fig. 5 represents a view of the parts shown in Fig. 4, taken at right angles to the view of said figure.

The reference characters are used in the same sense in the drawings and the specification.

Numeral 1 represents the segmental tunnel-shell.

2 represents the section of concrete lining in place.

3 represents an arched form, preferably made of iron plate, having the proper curvature for the interior surface of the tunnel-lining. It rests upon and is secured to the framework 4 and is provided with openings 5 and 6, which openings are closed by the closures or doors 7 and 8, hinged to the arched form and provided with any convenient means (not shown) for locking said doors in a closed position. The transverse edges of the plate are provided with hinged gate-closures 9, which are adapted to swing up and substantially close the space between the curved plate and the flanges of the segments of the tunnel-shell. These hinged gates are provided with means, as the bolts 10, for holding them in a closed position. Near the center of one of the transverse edges of the arched form I provide an extension on which operates the slidable ram 11. The ram 11 has a face 12, normal to the curved form 3 and projecting up even with the tops of the gates 9.

It will be seen that the arched form 3, together with the hinged gates 9 and the closures 7 and 8, forms a means for confining the plastic concrete to a limited space, so that when the ram 11 is forced inwardly a pressure is brought to bear upon the concrete, thus forcing it compactly into all the irregular recesses formed by the flanges of the segments and the nuts and bolt-heads.

At a convenient distance below the top of the arched form I provide a working platform 13 for workmen to stand upon while shoveling the concrete in place and for the reception of concrete. Beneath the platform 13 I provide a truck-frame 14, composed of strong longitudinal members 15, 16, and 17, which are tied together by suitable transverse members 18, and between the frame 4, which supports the arched form, and the truck-frame 14 I provide jack-screws 19, which operate in the nuts 20 and sockets 21. By means of these screws the curved form 3 may be raised in position preparatory to the formation of a segment of concrete lining and lowered to free the form from the lining after the concrete has set. The truck-frame 14 is provided with truck-wheels 22, which are mounted in the bracket 23 and connected by the links 24 to the transverse member 15. The bracket 23 rests upon the screw 25, which operates in the nut 26, thereby providing means for raising and lowering the truck-wheels 22. By means of this construction when it is desired to shift the location of the apparatus the screws 25 are turned to raise the truck-frame upon the truck-wheels 22. When, however, the apparatus is being used, a very great pressure is exerted upon the truck-frame, and in order to avoid bringing this pressure on the truck-wheels 22 and also to better distribute the pressure over a greater length of track the tram-wheels are turned upward relatively to the truck-frame and the lower member 15 of the truck-frame is allowed to rest upon the track.

The concrete will ordinarily be mixed in the base of the tunnel, and in order to provide an expeditious and convenient means for moving the concrete from the base of the tunnel to the platform 13 I provide a frame 27, at the ends of which are mounted pulleys 28. On these pulleys is mounted a conveyer-belt 29 of any suitable construction. At about the center of the frame 27 a shaft 30 is mounted, on the ends of which are the tram-wheels 31, adapted to engage the tramways 32. For convenience of illustration the frame 27 is herein shown somewhat shorter and therefore inclined at a steeper angle than would ordinarily be used in practice. It is obvious, however, that any convenient length and inclination may be chosen for any particular circumstances.

The operation of my improved apparatus is as follows: The concrete in the base and sides of the tunnel will usually be installed before that in the upper part. This having been done, the apparatus is brought into position under two segments to be concreted, the tram-wheels 22 are raised, so as to permit the beams 15 to rest firmly upon the track, and the jack-screws 19 are turned to adjust the arched form 3 to the proper height, the doors 7 and 8 are opened, and the gates 9 are also left open or down with the exception of the end gates or those adjacent to the upper part of the concrete at the sides of the tunnel. The concrete is then filled in place and tamped around the bolt-heads and nuts, and as the concrete rises the next following gates are closed. During this work, also, concrete may be introduced through the apertures 6 until a level is reached which requires the closing of the doors. As the concrete is carried to a point nearer the top the successive gates and the doors 7 are closed, and finally the last portion of the concrete is inserted in the aperture through which the ram 12 operates, after which the ram 12 is forced against the concrete with great pressure. When the concrete has set sufficiently, the gates 9 and the ram 12 are withdrawn and the curved form lowered, when the apparatus may be moved into position for the next section to be operated upon.

In the practical operation of lining the upper portion of a tunnel with my improved apparatus I prefer to use not less than two centers, one of which will operate in advance of the other upon alternate sections, as illustrated in Fig. 2. The following center will then be employed in the same manner to concrete the remaining sections, as at 33 and 34 in Fig. 2. When the center is employed for such sections of lining, the gates 9 and the ram 11 will be omitted. In all other respects, however, the operation of the apparatus will be the same as that previously described.

By means of using two sets of apparatuses in this manner one gang of men may be kept constantly employed, using the two centers alternately and allowing the concrete to set upon one center while the other is being used.

The conveyer 29 is made symmetrical and capable of being operated in either direction, and being hung upon the shaft 30 at substantially its center it may be readily rolled along and reversed when desirable, as would be the case where one conveyer would be used between two sets of apparatuses.

By supporting the apparatus upon the rails 32 along the inner edges of the platforms and keeping the frame which supports the curved form 3 above the platform the space required for the operation of cars for carrying excavated material and other articles back and forth in the tunnel by the concreting apparatus is not in any way interfered with. This makes it possible to construct the concrete lining while the tunnel-shell is being pushed forward through the earth, thereby greatly strengthening the tunnel at a much earlier time than would otherwise be possible and avoiding long delays incident to the other forms of apparatus.

It is therefore evident that by means of my improved method and apparatus I am enabled to simultaneously and without interference carry on the two sets of operations—namely, the driving of the heading, erecting the tunnel-tube, and transporting materials through the completed portion of the tunnel-tube between the entrance and heading, and also the transporting of concreting materials into the tube and applying circumferentially and progressively a concrete lining to the tube-walls in the rear of the heading and around the paths of transit of material to and from the heading.

Having thus described my invention, what I claim is—

1. In tunnel construction, elevated ways between entrance and heading, material-carriers on certain of said ways and devices mounted upon carriers on other of said ways for working upon the walls of the tunnel around all said ways without interference with the running of the material-carriers.

2. In tunnel construction, means for transporting materials to and from the heading along elevated paths spaced inwardly from the tube side walls, a center or hood above and overhanging said paths, and means movable along parallel paths for carrying and operating said center for the purposes set forth.

3. In tunnel construction, means for applying a concrete lining to the tunnel-tube, comprising an arched hood or center conforming to the curvature of the tunnel-roof, means for carrying the same longitudinally and adjusting it radially within the tube, and means for transporting materials to and from the tunnel-heading within the radius of said hood and on each side of its carrier.

4. In tunnel construction, elevated interspaced ways spaced from the sides of the tunnel-passage, means for conveying materials along said ways to and from the heading, a way intermediate said first ways, and means movable along said central way, for applying a lining to the tunnel-tube.

5. In tunnel construction, means for simultaneously carrying on the several operations of driving the heading, erecting the tube, and applying a concrete lining thereto, comprising a substantially diametric platform or support erected progressively behind and following the advance of the heading, tracks upon the same for material-carriers, other parallel ways along the platform, a center overhanging said tracks and movable along said ways, and means for adjusting its position radially.

6. In a center for constructing the concrete lining of tunnels, the combination with an arched form and means for supporting said form, of an opening in said arched form and a closure for said opening.

7. In a center for forming concrete tunnel-linings, the combination with an arched form and support therefor, means for confining concrete, a ram adapted to exert pressure on the concrete and means for actuating said ram.

8. In an apparatus for forming concrete linings for tunnels, the combination with an arched form and a support therefor, of removable closures secured to the transverse edges of said arched form.

9. In an apparatus for forming concrete linings for tunnels, the combination with a cylindrical center and support therefor, of plates arranged along the transverse edges of and hinged to said cylindrical form to produce a substantially closed chamber for the reception of concrete, openings in said cylindrical form and closures for said openings.

10. In an apparatus for forming concrete linings for tunnels, the combination with an arched form and support therefor, of plates hinged to the edges of said form, a laterally-projecting extension to said form, a slidable member mounted on said extension having a face substantially normal thereto and means for forcing said slidable member against the concrete upon said form.

11. In an apparatus for forming concrete linings for tunnels, the combination with an arched form, of a framework adapted to support said arched form, tram-wheels secured to said frame, tracks for said tram-wheels and means for raising and lowering said tram-wheels into and out of operative position.

12. In an apparatus for constructing concrete linings for tunnels, the combination with an arched form and framework secured to said form, of a truck-frame adapted to support said form, tram-wheels secured to said truck-frame and means for raising and lowering said arched form and framework relative to said truck-frame.

13. In an apparatus for constructing concrete linings in tunnels, the combination with an arched form and framework secured thereto, of a truck-frame, tram-wheels secured to said truck-frame, means for lowering and raising said tram-wheels into and out of action and lifting-jacks between said truck-frame and said framework.

14. In an apparatus for constructing concrete linings in tunnels, the combination with an arched form and framework secured thereto, of a platform secured to said framework and a conveyer adapted to convey concrete from the base of the tunnel to said platform.

15. In an apparatus for forming concrete lining for tunnels, the combination with platforms arranged along the sides and at an elevation above the base of the tunnel, of a traversing concreting apparatus mounted on said platforms.

16. In an apparatus for forming concrete lining for tunnels, the combination with platforms arranged along the sides of the tunnel, leaving a central opening therebetween, of a traversing concreting apparatus mounted on and spanning the space between said platforms.

17. In an apparatus for forming concrete lining for tunnels, the combination with platforms arranged along the sides of the tunnel, leaving a central opening therebetween, of tracks along the inner edges of said platforms, a portable concrete form mounted on said tracks, having its sides extend over and at an elevation above said platforms, whereby the roof of the tunnel above said platforms may be lined with concrete without interfering with the use of said platforms for other purposes.

In testimony whereof I have signed my name to this specification in the presence of two subscribing witnesses.

JESSE W. RENO.

Witnesses:
J. T. CRANE,
T. D. MERWIN.